United States Patent [19]

Takahashi et al.

[11] Patent Number: 4,888,374

[45] Date of Patent: Dec. 19, 1989

[54] SILICONE RUBBER COMPOSITION

[75] Inventors: Masaharu Takahashi; Takeo Yoshida, both of Annaka, Japan

[73] Assignee: Shin-Etsu Chemical Co., Ltd., Tokyo, Japan

[21] Appl. No.: 229,496

[22] Filed: Aug. 8, 1988

[30] Foreign Application Priority Data

Aug. 11, 1987 [JP] Japan ................................ 62-200401

[51] Int. Cl.$^4$ ............................................ C08L 23/00
[52] U.S. Cl. .................................... 524/227; 524/230; 524/233
[58] Field of Search ......................... 524/230, 233, 227

[56] References Cited

U.S. PATENT DOCUMENTS

| | | | |
|---|---|---|---|
| 3,817,894 | 6/1974 | Butler et al. | 524/230 |
| 4,490,324 | 12/1984 | Mollison | 524/230 |
| 4,500,665 | 2/1985 | Brecker et al. | 524/227 |

Primary Examiner—Melvyn I. Marquis
Attorney, Agent, or Firm—Birch, Stewart, Kolasch & Birch

[57] ABSTRACT

A silicone rubber composition comprising an organopolysiloxane and a curing catalyst for the organopolysiloxane. The releasing property of the composition is significantly improved by the addition of N,N'-alkylene bisamide having not less than 10 carbon atoms. The composition is particularly effective for molding in a mold or covering a wire core.

13 Claims, No Drawings

SILICONE RUBBER COMPOSITION

BACKGROUND OF THE INVENTION

1. Field of the Invention

The present invention relates to silicone rubber compositions which have good releasing properties and permit easy release from a mold after molding. Also, the silicone rubber compositions of the present invention do not adhere to a core of an electric wire when used to cover the core.

2. Description of the Prior Art

Silicone rubbers have a wide utility in various fields because of having good heat resistance, cold proofing and electric characteristics. For molding silicone rubber by the use of a mold, various methods of readily releasing the silicone rubber from the mold have been proposed and, in fact, have been put into practice.

For instance, when press molding vulcanization is effected, the mold is plated with chromium or coated with a tetrafluoroethylene resin on the inner surface thereof to allow easy release of silicone rubber moldings. However, when molding a complicated shape, the releasing effect is not necessarily satisfactory.

Alternatively, there has been adopted a method in which surface active agents diluted with water are sprayed over a mold. However, this method not only makes for a complicated procedure, but also may impede the quality of the molded articles formed.

Still alternatively, there has been proposed a method, for example, in United States patent No. 3,549,744 in which metal carboxylates are added to a silicone rubber so as to improve the releasing property of the silicone rubber. The releasing property of this rubber is also not always satisfactory.

On the other hand, since silicone rubbers have good electric characteristics, they are frequently employed for covering an electric wire having a core such as a copper wire, a tin-plated copper wire and the like, by extrusion molding. In this application, there arises the problem that, as time goes by the silicone rubber adheres to the core, due to the degradation of the heat resistance of the rubber.

To overcome the above problem, a number of improved methods have been proposed including, for example, a method in which fatty acids or metal salts of fatty acids are added to the silicone rubber (Japanese Patent Application Laid-open No. 58-32306), and methods using fatty acid amides having 10 or more carbon atoms (Japanese Patent Application Laid-open Nos. 57-159850 and 57-159851). The former method is not satisfactory with respect to the releasing property and durability. The latter methods have some effects but are not satisfactory in preventing the adhesion to a core at high temperatures exceeding 200° C. The amides, particularly indicated in the latter methods, are only primary amides such as stearic acid amide, which are gradually thermally decomposed at temperatures above 175° C. and would lose their efficacy.

SUMMARY OF THE INVENTION

It is accordingly an object of the present invention to provide a silicone rubber composition which has a good releasing property from a mold and does not adhere to a core of an electric wire when applied to such a wire.

It is another object of the present invention to provide a silicone rubber composition, which comprises an N,N-alkylene bisamide having 10 or more carbon atoms, whereby the silicone rubber is improved in the releasing property.

The above objects can be achieved, according to the present invention, by a silicone rubber composition which comprises an organopolysiloxane and a curing agent therefore, and an effective amount of an N,N'-alkylene bisamide compound having 10 or more carbon atoms. The addition of the bisamide compound is effective in improving the mold releasing property and also in preventing adhesion of the silicone rubber to the core of an electric wire.

DETAILED DESCRIPTION OF THE INVENTION

The silicone rubber composition of the present invention comprises an organopolysiloxane. The organopolysiloxane comprises units of the following general formula,

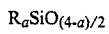

$$R_a SiO_{(4-a)/2}$$

in which R independently represent an unsubstituted or substituted monovalent hydrocarbon group having 1 to 10 carbon atoms, preferably 1 to 8 carbon atoms, including an alkyl group such as a methyl group, an ethyl group, a propyl group, a butyl group and the like, an alkenyl group such as a vinyl group, an allyl group, a butenyl group and the like, an aryl group such as a phenyl group, a tolyl group, or those groups indicated above in which part or the total of the hydrogen atoms bonded to the carbon atoms of the groups are substituted with a halogen atom, a cyano group and the like, e.g., a chloromethyl group, a chloropropyl group, a 3, 3, 3-trifluoropropyl group, a 20-cyanoethyl group and the like, and is a positive integer of from 1.90 to 2.05.

The organopolysiloxane has preferably a linear molecular structure although it may contain a molecular chain in the molecule. It is preferred that the organopolysiloxane is blocked with a terminal triorganosilyl group or hydroxyl group. Examples of the triorganosilyl group include a trimethylsilyl group, a dimethylvinylsilyl group, a methylphenylvinylsilyl group, a methyldiphenylsilyl group, a methyldivinylsilyl group, a trivinylsilyl group and the like.

The organopolysiloxane is not critical with respect to the degree of polymerization and should preferably have a viscosity of 300 centistokes or more, preferably 500,000 to 20,000,000 centistokes, at 25° C.

The curing catalyst used in the composition of the present invention is conveniently an organic peroxide which is ordinarily used to facilitate the thermal curing of the silicone rubber composition. Examples of such a catalyst include benzoyl peroxide, monochlorobenzoyl peroxide, 2, 4-dichlorobenzoyl peroxide, t-butyl perbenzoate, dicumyl peroxide, 2, 5-bis-(t-butyl peroxy)-2, 5-dimethylhexane and the like. These peroxides are used singly or in combination. The amount of the catalyst is preferably from 0.1 to 5 parts by weight per 100 parts by weight of the organopolysiloxane.

The silicone rubber composition of the present invention should preferably contain finely powdered silica fillers for the purpose of reinforcement, thickening, improvement of workability, and extension. Such silica fillers include, for example, fumed silica, wet silica, fumed silica and wet silica subjected to hydrophobic treatment on the surface thereof, quarts fine powder, diatomaceous earth and the like. These fillers should preferably have a specific surface area of 1m²/g or more, preferably 50 to 400 m²/g by a BET method. The amount of the finely powdered silica filler is preferably in the range of from 5 to 500 parts, more preferably from 10 to 300 parts, per 100 parts by weight of the organopolysiloxane. If the amount is less than 5 parts by weight, not only is the intended reinforcement not attained, but also the workability may become unsatisfactory. If the amount is over 500 parts by weight, working characteristics such as a flow behavior and a discharging property may be lower.

The silicone rubber composition of the present invention further comprises an N,N'-alkylene bisamide having 10 or more carbon atoms, preferably 10 to 60 carbon atoms, more preferably 10 to 40 carbon atoms, by which the releasing property is improved. Examples of the N,N'-alkylene bisamide include N,N'-methylene bisamides such as N,N'-stearic acid methylene bisamide, N,N'-behenic acid methylene bisamide, N,N'-myristic acid methylene bisamide, N,N'-caproic acid methylene bisamide and the like, N,N'-ethylene bisamides such as N,N'-stearic acid ethylene bisamide, N,N'-caproic acid ethylene bisamide and the like, and N,N'-hexamethylene bisamides such as N,N'-stearic acid hexamethylene bisamide, N,N'-caproic acid hexamethylene bisamide, N,N'-hydroxystearic acid hexamethylene bisamide and the like. The bisamides may be used singly or in combination. The amount of the bisamide is preferably in the range of from 0.03 to 10 aprts by weight, more preferably from 0.1 to 10 parts by weight, particularly 0.1 to 5 parts by weight, per 100 parts by weight of the organopolysiloxane. If the amount is less than 0.03 parts by weight, the intended releasing property and capability of preventing adhesion to a core may not be obtained. If the amount is over 10 parts by weight, the releasing property is not improved to the degree expected by the increased amount. Further, the inherent properties of the silicone rubber such as good heat resistance may be impeded.

The silicone rubber composition of the present invention is obtained by uniformly mixing predetermined amounts of the essential ingredients. The composition of the present invention may further comprise various additives depending upon the purpose and the manner of application. For instance, dispersants such as low molecular weight siloxane having a degree of polymerization of not higher than 100, silanol group-containing silane or alkoxy group-containing silane, heat resistance improvers such as iron oxide, cerium oxide, iron oxylate, titanium oxide and the like, pigments, flame retarders such as platinum compounds, palladium compounds and the like, and other additives ordinarily used in silicone rubber compositions.

The silicone rubber compositon of the present invention can be shaped into desired forms, such as pipes, sheets, profile moldings, wires and the like, according to ordinary rubber molding techniques such as compression molding, extrusion molding, calender molding, transfer molding, injection molding and the like, and subsequently cured by crosslinkage to obtain silicone rubber mold articles. The curing conditions are not limited. In general, the composition may be cured at a temperature range of from 100 to 150° C. for several seconds to one hour with or without pressure and, if necessary, followed by after-heating at a temperature range of from 200° to 250° C. for 1 to 48 hours.

The present invention is more particularly described by way of examples, which should not be construed as limiting the invention. Comparative examples are also shown. In examples and comparative examples, the parts are by weight and the viscosity is a measurement at 25° C.

EXAMPLE 1 AND COMPARATIVE EXAMPLES 1 AND 2

To 100 parts of an dimethylpolysiloxane, which was blocked with a dimethylvinylsilyl group at both ends thereof, consisted of 99.75 mole% of $(CH_3)_2SiO$ units and 0.25 mole% of $(CH_2=CH)(CH_3)Si)_{0.5}$ units, and had a viscosity of 10,000,000 centistokes were added 40 parts of fumed silica (Japan Aerosil Co., Ltd. commercial name: Aerosil 200) and 4 parts of diphenylsilanediol as a dispersant, and uniformly kneaded, followed by thermal treatment at 150° C. for 4 hours and peptization and plasticization with a two-roll mill to obtain a base compound.

To the base compound were added a releasing agent of N,N'-stearic acid hexamethylene bisamide or stearic amide and a vulcanizer of 2,5-bis-(t-butyl peroxy)-2,5-dimethylhexane in amounts indicated in Table 1, followed by kneading by two rolls to obtain three silicone compositions.

Thereafter, these silicone rubber compositions were subjected to press molding at 170° C. for 10 minutes to obtain cylindrical moldings having a diameter of 30 mm and a length of 15 mm. The force required for removing the molding from a mold was measured. The results are shown in Table 1.

TABLE 1

| | Example 1 | Comparative 1 | Example 2 |
|---|---|---|---|
| dimethylpolysiloxane | 100 parts | 100 parts | 100 parts |
| Aerosil 200 | 40 | 40 | 40 |
| diphenylsilanediol | 4 | 4 | 4 |
| N,N'—stearic acid hexamethylene bisamide | 0.5 | — | — |
| stearic amide | — | — | 0.5 |
| 2,5-bis-(t-butyl peroxy)-2,5-dimethylhexane | 0.5 | 0.5 | 0.5 |
| force required for removal from mold (kgf) | 4.5 | 11.3 | 9.6 |
| evaluation | removed very smoothly | heavily | rather heavily |

The results of Table 1 reveal that the silicone rubber compositon of the invention is better with respect to the property of release from mold.

EXAMPLE 2-5

The base compound prepared in Example 1 was used to obtain four silicone rubber compositions indicated in Table 2 in the same manner as in Example 1. These compositions were molded similar to Example 1 to obtain moldings.

The removing force from the mold and mechanical characteristics were determined according o JIS K-6301. The results are shown in Table 2 below.

TABLE 2

| | Example | | | |
|---|---|---|---|---|
| | 2 | 3 | 4 | 5 |
| dimethylpolysiloxane | 100 parts | 100 parts | 100 parts | 100 parts |
| Aerosil | 40 | 40 | 40 | 40 |
| diphenylsilanediol | 4 | 4 | 4 | 4 |
| N,N'—stearic acid hexamethylene bisamide | 0.03 | 0.5 | 5 | 8 |

TABLE 2-continued

| | Example | | | |
|---|---|---|---|---|
| | 2 | 3 | 4 | 5 |
| 2,5-bis-(t-butyl peroxy)-2,5-dimethylhexane | 0.5 | 0.5 | 0.5 | 0.5 |
| force required to removal from mold (kgf) | 8.1 | 4.5 | 3.5 | 3.3 |
| Initial: | | | | |
| hardness | 51 | 50 | 49 | 46 |
| tensile strength (kgf/cm$^2$) | 112 | 109 | 106 | 93 |
| elongation (%) | 440 | 450 | 420 | 380 |
| After 96 hours at 220° C.: | | | | |
| variation in hardness (point) | +5 | +5 | +7 | +13 |
| residual rate of tensile strength (%) | 89 | 88 | 80 | 68 |
| residual rate of elongation (%) | 83 | 80 | 75 | 57 |

The results of Table 2 reveal that the addition of the N,N'-stearic acid hexamethylene bisamide results in an improvement of the releasing property.

EXAMPLE 6 AND COMPARATIVE EXAMPLES 3,4

The base compound obtained in Example 1 was used to prepare three silicone rubber compositions indicated in Table 3 in the same manner as in Example 1. These silicone rubber compositions were each subjected to extrusion molding on a tin-plated soft copper wire (single wire with a diameter of 1 mm) to cover it with a 0.6 mm thick silicone rubber. Thereafter, silicone rubber was thermally vulcanized at a normal pressure in a hot air furnace at 450° C. so that a residence time was 15 seconds, thereby obtain an electric wire.

The wires were each checked with respect to the capability of preventing adhesion to the core. The results are shown in Table 3.

The capability of preventing adhesion to the core was judged based on the following evaluation standards as to a degree of rubber deposition on the core when the wire-covering rubber was removed by a stripper.

EVALUATION STANDARDS:

O : no rubber left with a clean core and a solder spread well

X : rubber left by adhesion to the core and not removed when stripped

TABLE 3

| | Example 6 | Comparative 3 | Example 4 |
|---|---|---|---|
| dimethylpolysiloxane | 100 parts | 100 parts | 100 parts |
| Aerosil 200 | 40 | 40 | 40 |
| diphenylsilanediol | 4 | 4 | 4 |
| 2,4-dichlorobenzoyl peroxide (50% silicone paste) | 1.5 | 1.5 | 1.5 |
| N,N'—stearic acid hexamethylene bisamide | 0.5 | — | — |
| stearic amide | — | — | 0.5 |
| Capability of preventing core adhesion: | | | |
| initial | o | o | o |
| 200° C./4 hours | o | x | o |
| 200° C./8 hours | o | x | x |
| 200° C./16 hours | o | x | x |

The results of Table 3 reveal that the silicone composition of the invention exhibits better capability of preventing the core adhesion when used to make an electric wire.

What is claimed is:

1. A silicone rubber composition comprising an organopolysiloxane, a curing catalyst for said organopolysiloxane, and an N,N'-alkylenebisamide having not less than 10 carbon atoms, said organopolysiloxane having units of the following formula, $$R_aSiO_{(4-a)/s}$$

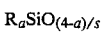

in which R represents a monovalent hydrocarbon group having 1 to 10 carbon atoms, and a is a positive value o from 1,90 to 2.05, said curing catalyst being an organic peroxide, and said N,N'-alkylenebisamide being present in an amount effective in improving the mold releasing property and preventing adhesion of the silicone rubber to the core of an electric wire.

2. The silicone rubber composition according to claim 1, wherein said curing catalyst is used in an amount of from 0.1 to 5 parts by weight per 100 parts by weight of said organopolysiloxane.

3. The silicone rubber composition according to claim 1, wherein said N,N'-alkylene bisamide is used in an amount of from 0.03 to 10 parts by weight per 100 aprts by weight of said organopolysiloxane.

4. The silicone rubber composition according to claim 1, further comprising a finely powdered silica filler.

5. The silicone rubber composition according to claim 4, wherein said silica filler is used in an amount of from 5 to 500 parts by weight per 100 parts by weight of said organopolysiloxane.

6. The silicone rubber composition according to claim 1, wherein R represents a monovalent hydrocarbon group having 1 to 8 carbon atoms.

7. The silicone rubber composition according to claim 1, wherein said organopolysiloxane is blocked with a terminal trioganosilyl group or hydroxy group.

8. The silicone rubber composition according to claim 7, wherein said terminal triorganosilyl group is selected from group consisting of a trimethylsilyl group, a dimethylvinylsilyl group, a methylphenylvinylsilyl group, a methyldivinylsilyl group and a trivinylsilyl group.

9. The silicone rubber composition according to claim 1, wherein the N,N'-alkylenebisamide has 10 to 60 carbon atoms.

10. The silicone rubber composition according to claim 1, wherein the N,N'-alkylenebisamide has 10 to 40 carbon atoms.

11. The silicone rubber composition according to claim 1, wherein N,N'-alkylenebisamide is an N,N-methylenebisamide, an N,N'-ethylenebisamide, an N,N-hexamethylenebisamide or mixtures thereof.

12. The silicone rubber composition according to claim 1, wherein said N,N'-alkylenebisamide is used in an amount of from 0.1 to 10 parts by weight per 100 parts by weight of said organopolysiloxane.

13. The silicone rubber composition according to claim 1, wherein said N,N'-alkylenebisamide is used in an amount of from 0.1 to 5 parts by weight per 100 parts by weight of said organopolysiloxane.

* * * * *